June 15, 1965  V. J. JANDASEK  3,188,886
TRANSMISSION
Filed Nov. 13, 1962  2 Sheets-Sheet 1
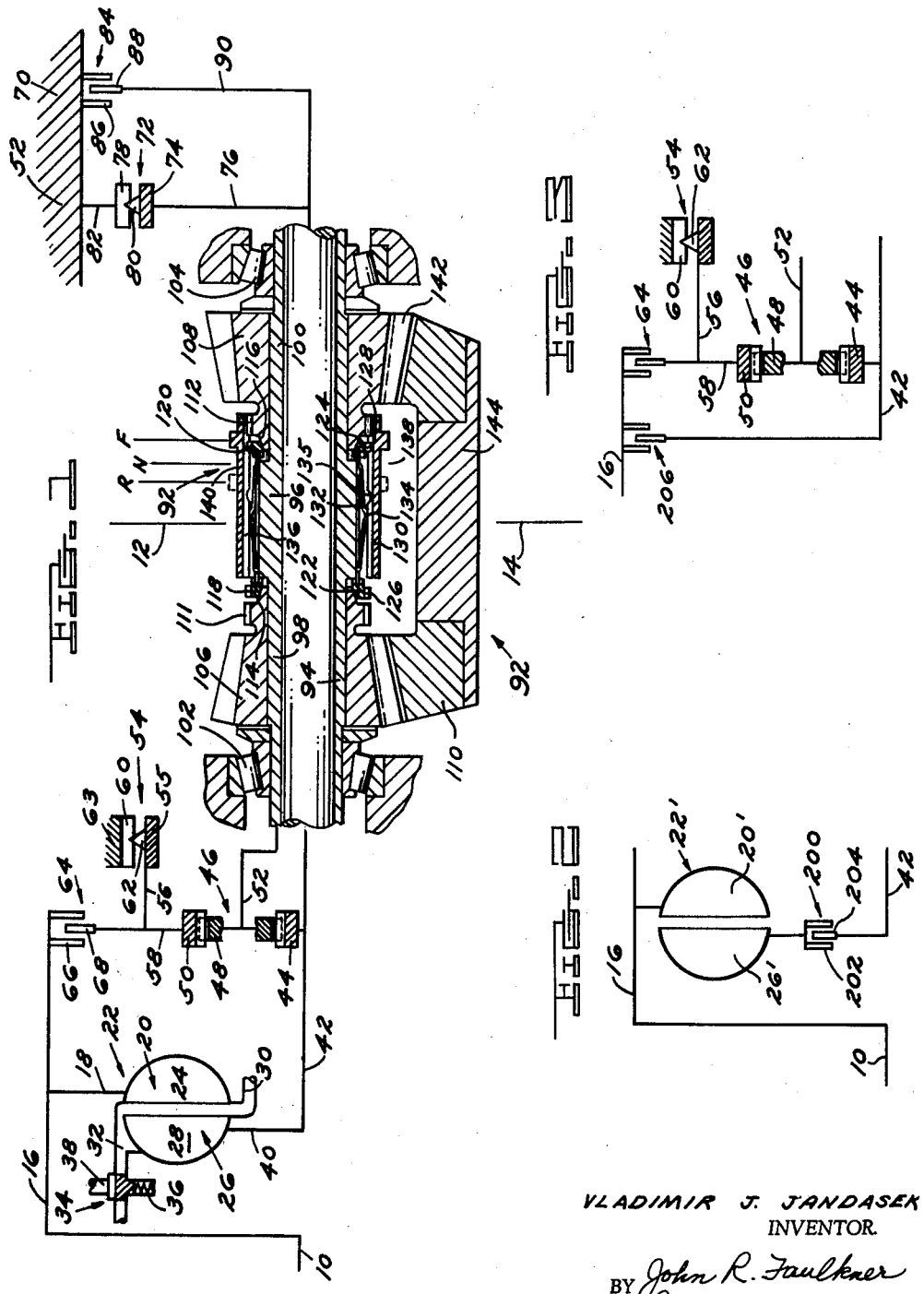
VLADIMIR J. JANDASEK
INVENTOR.
BY John R. Faulkner
Robert E. McCollum
ATTORNEYS June 15, 1965     V. J. JANDASEK     3,188,886
TRANSMISSION
Filed Nov. 13, 1962     2 Sheets-Sheet 2
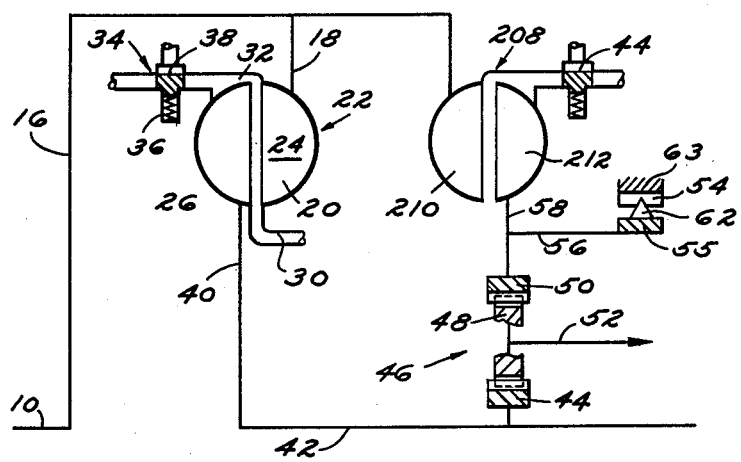
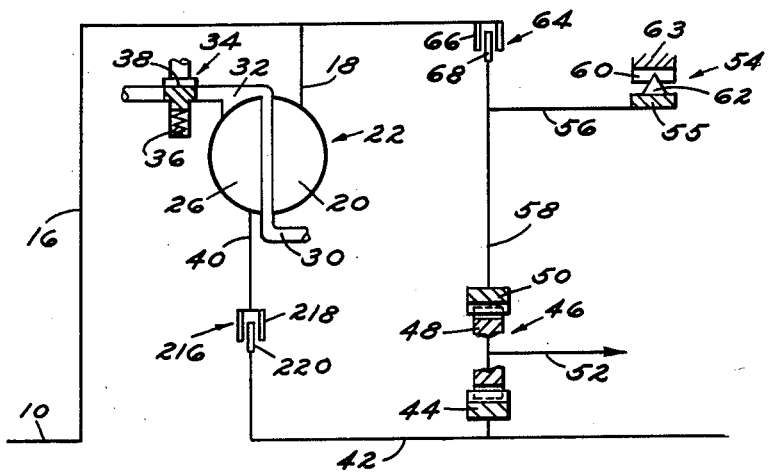
VLADIMIR J. JANDASEK
INVENTOR.
BY John R. Faulkner
Robert E. McCollum
ATTORNEYS ނ
United States Patent Office 3,188,886
Patented June 15, 1965

1

3,188,886
TRANSMISSION
Vladimir J. Jandasek, Dearborn, Mich., assignor to Ford
Motor Company, Dearborn, Mich., a corporation of
Delaware
Filed Nov. 13, 1962, Ser. No. 237,137
11 Claims. (Cl. 74—688)

This invention relates to an automatic transmission, and more particularly to one that is lightweight, economical to manufacture, and is simple in construction.

It is an object of the invention to provide an automatic transmission construction combining a plurality of fluid pressure controlled torque transmitting means with a single gear set and direction reversing means to provide a simplified transmission having three forward speed drives, neutral, a number of reverse drives, and hill braking.

It is also an object of the invention to provide a transaxle type transmission having a single power input shaft and a number of power output shafts at right angles thereto operatively connected by fluid pressure controlled torque transmitting means and a planetary gear train.

It is also an object of the invention to provide an automatic transmission construction having one or more hydrodynamic drive devices of the fill and empty type and a simple planetary gear set and a double axle pinion assembly, controlled by mechanical and fluid pressure actuated devices in a manner providing a simplified low-cost construction.

It is a still further object of the invention to provide a simplified transmission construction having means affording a hill braking effect.

It is another object of the invention to provide a three-speed transmission construction combining hydraulic and mechanical torque transmitting means in a manner requiring only a minimum number of fluid pressure controls therefor.

Other objects, features and advantages of the invention will become apparent upon reference to the succeeding, detailed description thereof and to the drawings illustrating the preferred embodiment thereof; wherein, FIGURE 1 is a schematic illustration of a transmission embodying the invention; and, FIGURES 2, 3, 4, and 5 are schematic illustrations of modifications of portions of the transmission of FIGURE 1.

FIGURE 1 shows schematically the top half portion of a transmission of the transaxle type, i.e., it has an input shaft 10 extending at right angles to two output axle shafts 12 and 14. Drive shaft 10 is connected by a shell member 16 and a connecting flange 18 to the rotatable semitoroidal pump member 20 of a hydrodynamic torque transmitting fluid coupling 22. The pump has a row of dish-shaped blades 24 facing a turbine member 26 having a row of similarly shaped blades 28.

The coupling 22 is of the fill and empty type, i.e., it is adapted to be filled or emptied of fluid to vary the transmission of torque in a known manner from the pump to the turbine from zero to a maximum. The coupling is filled at its inner diameter with operating fluid supplied through a line 30 connected to a fluid pressure source, not shown. The coupling discharges at its outer diameter through the space between the pump and turbine mem-

2 bers into an exhaust or vent line 32 controlled by a coupling vent valve 34. Valve 34 is biased by a spring 36 to a position opening or unblocking line 32 and is moved to a blocking position by the application of fluid pressure through a line 38 to act on the top of the valve. The fluid in line 38, which may be termed signal pressure, is selectively supplied to the valve from a fluid pressure control system, not shown, at substantially the same time as the coupling is filled. This signal pressure is subsequently cut off at the same time as the supply of operating fluid to the coupling is terminated to render the coupling inoperable. The valve 34 rotates with the pump housing and the centrifugal force acting on the mass of the valve is therefore generally sufficient to maintain it in an open or unblocking position in the absence of counteracting forces. The spring 36, therefore, may be eliminated if desired.

Turbine member 26 is connected by a flange 40 and a shaft 42 to the sun gear 44 of a gear set 46. The gear set is of the simple planetary type having a number of planet pinions 48 (only one shown) meshing with the sun gear and a ring gear 50. The pinions are rotatably supported upon a carrier member 52 that is drive connected to the transmission power output shafts 12 and 14 in a manner to be described. The gear set is adapted to be driven by either the sun or ring gears individually or by both simultaneously to provide two reduction drive speed ratios or a direct drive. For reduction drives, one gear becomes the driver, while the other then serves as a reaction member.

Ring gear 50 is adapted to be held stationary or against rotation in a counterclockwise or reverse direction by means of a one-way mechanical brake 54. The brake has an inner annular race 55 secured to ring gear 50 by connectors 56 and 58, and is separated from the outer annular race 60 by means of a number of sprags or rollers 62. Outer race 60 is secured to a portion 63 of the transmission casing, and is therefore held stationary at all times. Brake 54 operates in a known manner locking up or engaging by wedging the rollers between the races to prevent reverse rotation of the ring gear, while releasing the inner race upon forward or clockwise gear rotation.

Initially, the resistance to movement of carrier 52 because of its connection to the output shafts 12 and 14 is sufficient to hold it stationary. Therefore, forward or clockwise rotation of input shaft 10 with coupling 22 filled rotates turbine 26 and sun gear 44 forwardly. Pinions 48 therefore rotate reversely and attempt to turn ring gear 50 in the same direction, which rotation is prevented by the engagement of brake 54. The pinions 48 therefore planetate within the stationary ring gear in a forward direction rotating carrier 52 in the same direction at a speed reduced from that of sun gear 44 to provide a first or low speed reduction drive.

A second or intermediate speed reduction drive can be obtained by connecting ring gear 50 to the input drive shaft 10 by a clutch 64, emptying coupling 22, and holding sun gear 44 stationary to act as the reaction member for the gear set. The clutch 64 is of a known fluid pressure actuated type having a number of annular friction discs 66 secured to driving shell 20 and interleaved with an annular friction disc 68 secured to the ring gear 50 by the connector 58. It is engaged by fluid pressure actuated means, not shown, and may be disengaged by springs, also not shown.

Sun gear 44 is held against rotation in one direction by being connected to a portion 70 of the transmission housing through a one-way brake 72. The brake is similar in construction to brake 54 and has an inner race 74 connected to shaft 44 by a connector 76 and separated from an outer annular race 78 by a number of sprags or rollers 80. The outer race is held stationary at all times by a connection 82 to the portion 70 of the transmission housing. The brake prevents reverse or counterclockwise rotation of shaft 42 and sun gear 44 while permitting free rotation of the sun gear in a clockwise or forward direction.

Shaft 42 and sun gear 44 may also be prevented from rotating in either direction by a brake mechanism 84, such as would be the case where a hill braking effect is desired. Brake 84 is of the fluid pressure actuated type having a number of annular friction discs 86 slidably secured to the transmission housing. The discs 86 are interleaved with an annular disc 88 connected to shaft 42 and sun gear 44 by a flange 90. Actuation of the brake by fluid pressure means, not shown, renders the one-way brake 84 inoperative and provides a two-way positive drive between the input and output shafts.

A direct drive through the gear set is established by driving sun gear 44 and ring gear 50 simultaneously at substantially the same speeds. This is accomplished by filling coupling 22 and engaging clutch 64 to connect both gears to the drive shaft 10.

The transmission as thus far described provides three forward drive speed ratios, neutral, and hill braking. Reverse drive is obtained by means of a dual drive synchronized axle pinion assembly 92. As shown, the carrier 52 is fixed to one end of a power output pinion drive sleeve shaft 94, the opposite end of which is surrounded by a clutch synchronizer hub 96 splined or otherwise secured to it. The hub has axially extending sleeve portions 98 and 100 rotatably supported within the transmission housing by means of tapered roller bearings 102 and 104. A pair of drive pinion gears 106 and 108 are rotatably mounted on the sleeve portions, and each mesh with a diametrically opposite portion of a differential ring gear 110 to drive the gear in opposite directions.

The pinion gears are selectively coupled to the shaft 94 by the synchronizer. For this purpose, gears 106 and 108 are formed with clutch teeth 111 and 112 and external conical clutch surfaces 114 and 116. Blocking rings 118 and 120 are rotatably disposed about the clutch surfaces 114 and 116, and have internal mating conical clutch surfaces 122 and 124. The rings also are formed with external teeth 126 and 128. A synchronizer clutch sleeve 130 is slidably splined upon hub 96 and can be moved axially to engage either the clutch teeth 111 or 112. A thrust bar 132 is slidably mounted in a groove on hub 96 and has a bead 134 frictionally engaging a detent 135 in sleeve 130. The thrust bar is actuated by the sleeve and is adapted to apply an axial clutching force to either of the blocker rings 118 or 120. A clutching action between the blocker ring and the associated cone clutch surfaces establishes synchronization between shaft 94 and gear 106 or 108 at a time prior to engagement of the gear clutch teeth by the internal spline teeth 136 on the synchronizer slesueve.

The sleeve 130 is moved by a shifter fork (not shown). Movement of the sleeve to the right, for example, to the Forward or F position shown in FIGURE 1, moves blocker ring 120 to engage conical surfaces 116 and 124. This establishes synchronism between shaft 94 and gear 108. Clutch teeth 128 on the blocker ring and teeth 142 on the gear 108 are then engaged with the teeth 136 or sleeve 130, and gear 108 is locked to shaft 94. A similar action occurs when the sleeve 130 is moved to the left to the Reverse or R position to lock gear 106 to shaft 94.

Locking gear 106 to shaft 94 therefore drives ring gear 110 in a forward or clockwise direction, while locking gear 108 to the shaft drives the ring gear in the reverse or counterclockwise direction. A disengaged position of sleeve 130, indicated by the line N provides no drive to output shafts 12 and 14.

Ring gear 110 is secured to the carrier 144 (shown only schematically) of a differential assembly having side gears (not shown) secured to the output shafts 12 and 14 in a known manner. The shafts each form a portion of a universal joint yoke connected to the drive shafts for each of the vehicle wheels.

In operation, Neutral is established by emptying coupling 22 and moving synchronizer clutch sleeve 130 to its N position and disengaging friction clutch 64 and brake 84. No drive from input shaft 10 is therefore transmitted to the carrier 52 of gear set 46.

First or Forward speed drive is established by filling coupling 22, moving synchronizer clutch sleeve 130 to its F position and maintaining clutch 64 and brake 84 disengaged. Forward or clockwise rotation of drive shaft 10 and pump 20, as seen from the left of FIGURE 1, drives turbine 26 and sun gear 44 forwardly. Ring gear 50 being held against reverse rotation by brake 54 causes pinions 48 to planetate within the ring gear and drive carrier 52 and shaft 94 at a speed reduced from that of drive shaft 10. Gear 108 being meshed with ring gear 110 effects a drive of shafts 12 and 14 in a forward direction at reduced speeds.

An Intermediate or Second speed reduction drive is established by emptying coupling 22, engaging clutch 64, maintaining synchronizer clutch sleeve 130 in its F position and brake 84 released. Clockwise rotation of shaft 10 rotates ring gear 50 forwardly causing the pinions 48 to planetate about the sun gear 44, which is held against reverse rotation by one-way brake 72. The carrier 52 and shaft 94 therefore rotate shafts 12 and 14 in a forward direction at a speed reduced from that of drive shaft 10 but at a faster rate than when the gear set is conditioned for low speed operation.

Hill or coast braking may be provided in this speed range by engaging brake 84 to prevent rotation of sun gear 44 in a clockwise direction. The gear set is thus conditioned for a reduction drive in either direction. The driving of carrier 52 by axle shafts 12 and 14 effects an overdrive of ring gear 50 in a clockwise direction, this rotation being retarded by the resistance offered by the engine drive shaft 10.

Third speed forward or direct drive is established by filling coupling 22 and engaging clutch 64 with the synchronizer clutch sleeve 30 in its F position. The brakes 54, 72, and 84 are released. The simultaneous drive of ring gear 50 and sun gear 44 at substantially the same speeds locks up the gear set 46 to cause shaft 52 to be driven at engine speed. Shafts 12 and 14 therefore rotate at a speed reduction determined only by the differential assembly.

Two reverse reduction drives and reverse hill braking are established in the same manner as for establishing first and second forward speed drives and hill braking, except that the clutch synchronizer sleeve 130 is moved to the R position engaging shaft 94 and gear 106. The drive from carrier 52 to output shafts 12 and 14 therefore reverses the direction of rotation of the output shafts.

The synchronized connection of pinions 106 and 108 to the shaft 94 permits a smooth shift to be made from a forward to a reverse drive or vice versa with the engine running without clashing of the pinion gear and clutch teeth.

FIGURE 2 shows a modification of a portion of the FIGURE 1 transmission wherein a fluid coupling 22' of the constantly filled type combined with a fluid pressure actuated friction clutch 200 is substituted for the fill and empty type coupling 22 of FIGURE 1. In FIGURE 2, the turbine 26' is secured to a number of annular friction discs 202 interleaved with an annular disc 204 secured to sun gear shaft 42. The effectiveness of coupling 22' is therefore controlled merely by engaging or disengaging the clutch 200. In all other respects, the transmission of FIGURES 1 and 2 are identical and other details of construction and operation will therefore not be repeated.

FIGURE 3 shows another modification of the FIGURE 1 construction wherein a fluid pressure actuated clutch 206 is substituted for the FIGURE 1 fill and empty coupling 22. In this modification, the transmission of torque to the sun gear is controlled by the engagement or disengagement of clutch 206.

FIGURE 4 shows a still further modification utilizing a fill and empty type coupling 208 for the fluid pressure actuated clutch 64 of FIGURE 1. The transmission of torque from drive shaft 10 to ring gear 50 is controlled by the filling or emptying of coupling 208. The coupling is substantially identical in construction to that of coupling 26 and its details and operation are therefore not given. Suffice it to say that it has a pump 210, a turbine 212, and a vent valve 214, in the same manner as coupling 22. The remaining portions of the transmission are the same as in FIGURE 1.

FIGURE 5 illustrates another modification wherein a normally engaged neutral clutch 216 is interposed between the turbine member 26 and the shaft 42. The clutch is a fluid pressure actuated friction disc type having annular discs 218 secured to the turbine 26 and interleaved with an annular disc 220 secured to shaft 42. Neutral or no-drive condition can be established simply by disengaging clutch 216 with clutch 64 and brake 84 disengaged, even though coupling 22 may be filled with operating fluid and the remaining portion of the transmission conditioned for low speed forward drive operation.

From the foregoing, therefore, it will be seen that the invention provides an automatic transmission construction combining hydraulic and mechanical torque transmitting means from an input shaft to a plurality of output shafts at right angles thereto in such a manner that relatively few controls are necessary, and yet in a manner providing three forward drive speed ratios, neutral, hill or coast braking, and a plurality of reverse drive speed ratios.

While the invention has been illustrated in its preferred embodiments in the figures, it will be clear to those skilled in the arts to which the invention pertains that many changes and modifications may be made thereto without departing from the scope of the invention.

I claim:

1. A transmission having a forwardly rotating power input shaft and a power output shaft, and means operably connecting said shafts, said means including a plurality of fluid pressure controlled torque transmitting means and a planetary gear set having drive and driven and other rotatable members, means operably connecting one of said torque transmitting means to said input shaft and to said drive member, and selectively controlled direction reversing means connecting said driven member and said output shaft and being operable to condition said output shaft for rotation in opposite directions by said driven member, a plurality of said gear members having one-way braking means operably associated therewith for preventing rotation of said members in one direction and being individually activated at different times to condition said gear set for a plurality of different reduction drives, another of said torque transmitting means operably connecting said input shaft to another of said gear members, the selective combination and operation of said one-way brake means and said fluid pressure controlled means and said direction reversing means conditioning said transmission for a plurality of forward and reverse drives from said input to said output shafts.

2. A transmission as in claim 1 wherein said torque transmitting means comprise fluid pressure actuated friction devices.

3. A transmission having a forwardly rotating power input shaft and a plurality of power output shafts, and means operably connecting said shafts, said means including a plurality of fluid pressure controlled torque transmitting means and a planetary gear set having drive and driven and other rotatable members, means operably connecting one of said torque transmitting means to said input shaft and to said drive member, and selectively controlled direction reversing means connecting said driven member to said output shafts and being operable to condition said output shafts for rotation in opposite directions by said driven member, said direction reversing means including a ring gear operatively secured to said output shafts, said direction reversing means including a plurality of spaced drive pinions rotatably mounted on said driven member and meshing with opposite portions of said ring gear for driving said gear in opposite directions, and means mounted between said pinions on said driven member for rotation therewith and slidably in opposite axial directions to engage one or the other of said pinions to thereby condition said transmission for a forward or reverse drive of said output shafts, a plurality of said gear members having one-way braking means operably associated therewith for preventing rotation of said members in one direction and being individually activated at different times to condition said gear set for a plurality of different reduction drives, another of said torque transmitting means operably connecting one of said gear members to said input shaft, the selective combination and operation of said one-way brake means and said fluid pressure controlled means and said direction reversing means conditioning said transmission for a plurality of forward and reverse drives from said input to said output shafts.

4. A transmission having a forwardly rotating power input shaft and a power output shaft, and means operably connecting said shafts, said means including a plurality of fluid pressure controlled torque transmitting means and a planetary gear set having intermeshed sun and ring and planet pinion gear members and a pinion gear carrier member, means operably connecting one of said torque transmitting means to said input shaft and to one of said sun and gear members, and selectively controlled direction reversing means connecting said carrier member to said output shaft and being operable to condition said output shaft for rotation in opposite directions by said carrier member, said sun and ring gear members having one-way braking means operably associated therewith for preventing rotation of said members in one direction and individually activated at different times to condition said gear set for a plurality of different reduction drives, another of said torque transmitting means operably connecting the other of said sun and ring gear members to said input shaft, the selective combination and operation of said one-way braking means and said fluid pressure controlled means and said direction reversing means conditioning said transmission for a plurality of forward and reverse drives from said input to said output shafts.

5. A transmission having a forwardly rotating power input shaft and a power output shaft, and means operably connecting said shafts, said means including a hydrodynamic drive device having rotatable pump and turbine members and a planetary gear set having drive and driven and other rotatable member, means operably connecting said turbine and drive members, means operably connecting said input shaft to said pump member, means associated with said device for controlling the transmission of torque therefrom, and selectively controlled direction reversing means connecting said driven member to said output shaft and being operable to condition said output shaft for rotation in opposite directions by said driven member, a plurality of said gear members having one-way braking means operably associated therewith for preventing rotation of said members in one direction and being individually activated at different times to condition said gear set for a plurality of different reduction drives, and fluid pressure controlled torque transmitting means operably connecting one of said gear member to said input shaft, the selective combination and operation of said drive device and one-way brake means and said fluid pressure controlled means and said direction reversing means conditioning said transmission for a plurality of forward and reverse drives from said input to said output shafts.

6. A transmission having a forwardly rotating power input shaft and a power output shaft, and means operably connecting said shafts, said means including a hydrodynamic drive device adapted to be filled or emptied of fluid and having rotatable pump and turbine members and a planetary gear set having drive and driven and other rotatable members, means operably connecting said turbine and drive member, means operably connecting said input shaft to said pump member, and selectively controlled direction reversing means connecting said driven member to said output shaft and being operable to condition said output shaft for rotation in opposite directions by said driven member, a plurality of said gear members having one-way braking means operably associated therewith for preventing rotation of said members in one direction and being individually activated at different times to condition said gear set for a plurality of different reduction drives, and a fluid pressure activated friction device operably connecting one of said gear members to said input shaft, the selective combination and operation of said drive device and one-way brake means and said fluid pressure actuated device and said direction reversing means conditioning said transmission for a plurality of forward and reverse drives from said input to said output shafts.

7. A transmission having a forwardly rotating power input shaft and a power output shaft, and means operably connecting said shafts, said means including a plurality of hydrodynamic drive devices each adapted to be filled or emptied of fluid for controlling the transmission of torque therethrough and having rotatable pump and turbine members, said means also including a planetary gear set having a plurality of rotatable members, means operably connecting the turbine members of said devices to different ones of said rotatable members, means operably connecting said input shaft to the pump members, and selectively controlled direction reversing means connecting another member of said gear set to said output shaft and being operable to condition said output shaft for rotation in opposite directions by said latter member, said different ones of said gear members having one-way braking means operably associated therewith for preventing rotation of said members in one direction and being individually activated at different times to condition said gear set for a plurality of different reduction drives, the selective filling and emptying of said drive devices and operation of said one-way brake means and said direction reversing means conditioning said transmission for a plurality of forward and reverse drives from said input to said output shafts.

8. A transmission having a forwardly rotating power input shaft and a plurality of power output shafts substantially at right angles thereto, and means operably connecting said shafts, said means including a plurality of hydrodynamic drive devices each adapted to be filled or emptied of fluid for controlling the transmission of torque therethrough and having rotatable pump and turbine members, said means including a planetary gear set having a plurality of rotatable members, means operably connecting the turbine members of said devices to different ones of said rotatable members, means operably connecting said input shaft to the pump members, and selectively controlled direction reversing means connecting said driven member to said output shafts and being operable to condition said output shaft for rotation in opposite directions by said latter member, said direction reversing means including a ring gear operatively secured to said output shafts and a plurality of spaced drive pinions rotatably mounted on said driven member and meshing with opposite portions of said ring gear for driving said gear in opposite directions, and means mounted between said pinions on said driven member for rotation therewith and slidable in opposite axial directions to engage one or the other of said pinions to thereby condition said transmission for a forward or reverse drive of said output shafts, a plurality of said gear members having one-way brake means associated therewith for preventing rotation of said members in one direction and being individually activated at different times to condition said gear set for a plurality of different reduction drives, the selective filling and emptying of said drive devices and operation of said one-way brake means and said direction reversing means conditioning said transmission for a plurality of forward and reverse drives from said input to said output shafts.

9. A transmission having a forwardly rotating power input shaft and a power output shaft, and means operably connecting said shafts, said means including a plurality of hydrodynamic drive devices each adapted to be filled or emptied of fluid for controlling the transmission of torque therethrough and having rotatable pump and turbine members, said means including a planetary gear set having sun and planet pinion and ring gear members and a planet pinion carrier member, means operably connecting one of said turbine members to said sun gear and said ring gear to another of said turbine members, means operably connecting said input shaft to said pump members, and selectively controlled direction reversing means connecting said carrier member to said output shaft and being operable to condition said output shaft for rotation in opposite directions by said carrier member, said sun and ring gear members having one-way braking means operably associated therewith for preventing rotation of said latter members in one direction and being individually activated at different times to condition said gear set for a plurality of different reduction drives, friction means connected to one of said latter gear members for holding it against rotation in either direction, the selective emptying and filling of said drive devices and operation of said one-way brake means and said friction means and said direction reversing means conditioning said transmission for a plurality of forward and reverse drives from said input to said output shafts.

10. A transmission comprising, power input and output shafts, a fluid drive device of the fill and empty type driven by said input shaft, a planetary gearset having rotatable members at least one of which is operably connected to said output shaft, means for driving a second of said members from said drive device when filled while holding a third of said members stationary to establish one drive, and means to drive said third member from said input shaft while holding said second member stationary when said device is emptied of fluid to establish another drive.

11. A transmission having a forwardly rotating power input shaft and a power output shaft, and means operably connecting said shafts, said means including a hydrodynamic drive device having rotatable pump and turbine members, said means including a planetary gearset having sun and ring and planet gears and a planet gear carrier, means operably connecting the turbine member of said device to one of said sun and ring gears, means operably connecting said input shaft to the pump member, selectively controllable means associated with said drive device for controlling the transmission of torque therefrom to said one of said sun and ring gears, and selectively controlled direction reversing means connecting said carrier to said output shaft and being operable to condition said output shaft for rotation in opposite directions by said carrier, said direction reversing means including a ring gear operatively secured to said output shaft and a plurality of spaced drive pinions rotatably mounted on said carrier and meshing with opposite portions of said direction reversing ring gear for driving said latter gear in opposite directions, and clutch synchronizing means mounted between said pinions on said carrier for rotation therewith and slidable in opposite axial directions to engage one or the other of said pinions to thereby condition said transmission for a forward or reverse drive of said output shaft, said sun and ring gears having one-way brake means operably associated therewith for preventing rotation of said gears in one direction and being individually activated automatically at different times to condition said gearset for a plurality of different reduction drives, and selectively operable means when operable connecting said input shaft and the other of said sun and ring gears, the selective operation of said selectively operable means and selectively controllable means and operation of said one-way brake means and said direction reversing means conditioning said transmission for a plurality of forward and reverse drives from said input to said output shafts.

References Cited by the Examiner

UNITED STATES PATENTS

| | | | |
|---|---|---|---|
| 2,416,311 | 2/47 | Hanson | 74—688 |
| 2,572,310 | 10/51 | Brown | 74—688 X |
| 2,669,092 | 2/54 | Hammaren | 74—378 X |

DON A. WAITE, *Primary Examiner.*

UNITED STATES PATENT OFFICE
CERTIFICATE OF CORRECTION

Patent No. 3,188,886                          June 15, 1965

Vladimir J. Jandasek

It is hereby certified that error appears in the above numbered patent requiring correction and that the said Letters Patent should read as corrected below.

Column 3, line 48, for "Blocking" read -- Blocker --; line 64, for "sleseve" read -- sleeve --; line 71, for "or" read -- on --; column 4, line 7, for "havinig" read -- having --; column 6, line 66, for "member" read -- members --; line 67, for "members" read -- member --; column 7, line 5, for "member" read -- members --; column 8, line 26, for "year" read -- gear --.

Signed and sealed this 30th day of November 1965.

(SEAL)
Attest:

ERNEST W. SWIDER
Attesting Officer

EDWARD J. BRENNER
Commissioner of Patents